US010503211B2

(12) United States Patent
Yee et al.

(10) Patent No.: US 10,503,211 B2
(45) Date of Patent: Dec. 10, 2019

(54) MULTI-ORIENTATION DISPLAY DEVICE

(71) Applicant: Intel Corporation, Santa Clara, CA (US)

(72) Inventors: Chee Chun Yee, Bayan Lepas (MY); David W. Browning, Portland, OR (US); Bok Eng Cheah, Penang (MY); Jackson Chung Peng Kong, Tanjung Tokong (MY); Min Suet Lim, Penang (MY); Howe Yin Loo, Penang (MY); Poh Tat Oh, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/852,592

(22) Filed: Sep. 13, 2015

(65) Prior Publication Data

US 2017/0075388 A1 Mar. 16, 2017

(51) Int. Cl.
H05K 5/00 (2006.01)
H05K 7/00 (2006.01)
G06F 1/16 (2006.01)
G06F 3/041 (2006.01)

(52) U.S. Cl.
CPC .......... G06F 1/1652 (2013.01); G06F 1/1626 (2013.01); G06F 1/1641 (2013.01); G06F 1/1643 (2013.01); G06F 1/1675 (2013.01); G06F 3/041 (2013.01); G06F 2203/04102 (2013.01)

(58) Field of Classification Search
CPC .......................................................... G06F 3/02
USPC .................................................... 361/679.24
See application file for complete search history.

(56) References Cited

U.S. PATENT DOCUMENTS 7,714,801 B2   5/2010 Kimmel
2002/0173281 A1* 11/2002 Kobayashi .......... H04M 1/0218
                                                              455/575.1
2007/0004475 A1   1/2007 Kuo et al.
(Continued)

FOREIGN PATENT DOCUMENTS

KR   30-0757696     6/2015
KR   20150060278    6/2015
WO   2017044246     3/2017

OTHER PUBLICATIONS

International Search Report and Written Opinion in International Application No. PCT/US2016/046654 dated Nov. 17, 2016.
(Continued)

Primary Examiner — Jerry Wu
(74) Attorney, Agent, or Firm — Patent Capital Group

(57) ABSTRACT

A computing device includes a flexible display screen, a housing to house at least one processor device and at least one memory element, and a first wing to support a side portion of the display screen. The front face of the housing includes a center portion of the display screen. The first wing is connected to the housing by a hinge, the first wing configured to swivel about an axis defined by the hinge. The hinge is configured to lock the first wing in at least two wing positions, a first of the wing positions supports the side portion of the display screen in a first orientation, a second of the wing positions supports the side portion of the display screen in a second orientation, and the side portion of the display screen is active in the first orientation and hidden in the second orientation.

19 Claims, 13 Drawing Sheets

(56) References Cited

U.S. PATENT DOCUMENTS

| 2012/0280924 | A1* | 11/2012 | Kummer | G06F 1/1641 |
| | | | | 345/173 |
| 2012/0314399 | A1 | 12/2012 | Bohn | |
| 2014/0011548 | A1 | 1/2014 | Varela et al. | |
| 2016/0147362 | A1* | 5/2016 | Eim | G06F 1/1641 |
| | | | | 345/173 |

OTHER PUBLICATIONS

International Preliminary Report on Patentability in International Application No. PCT/US2016/046654, dated Mar. 22, 2018, 13 pages.

* cited by examiner

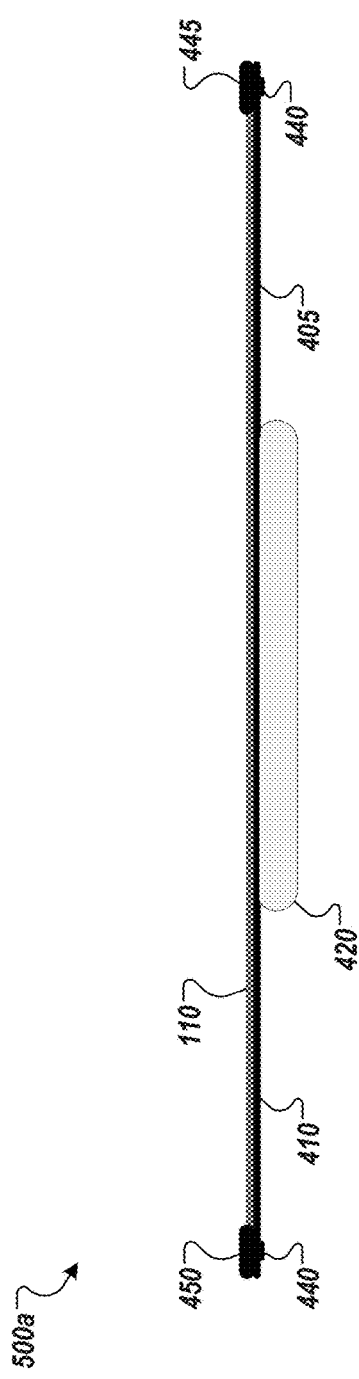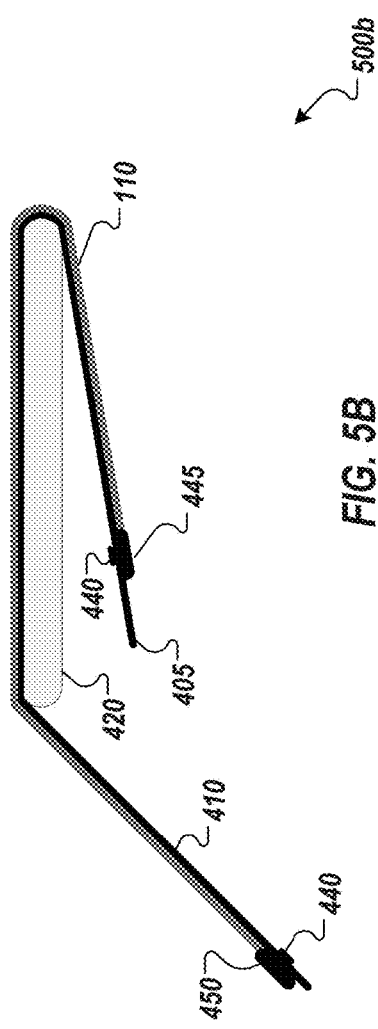

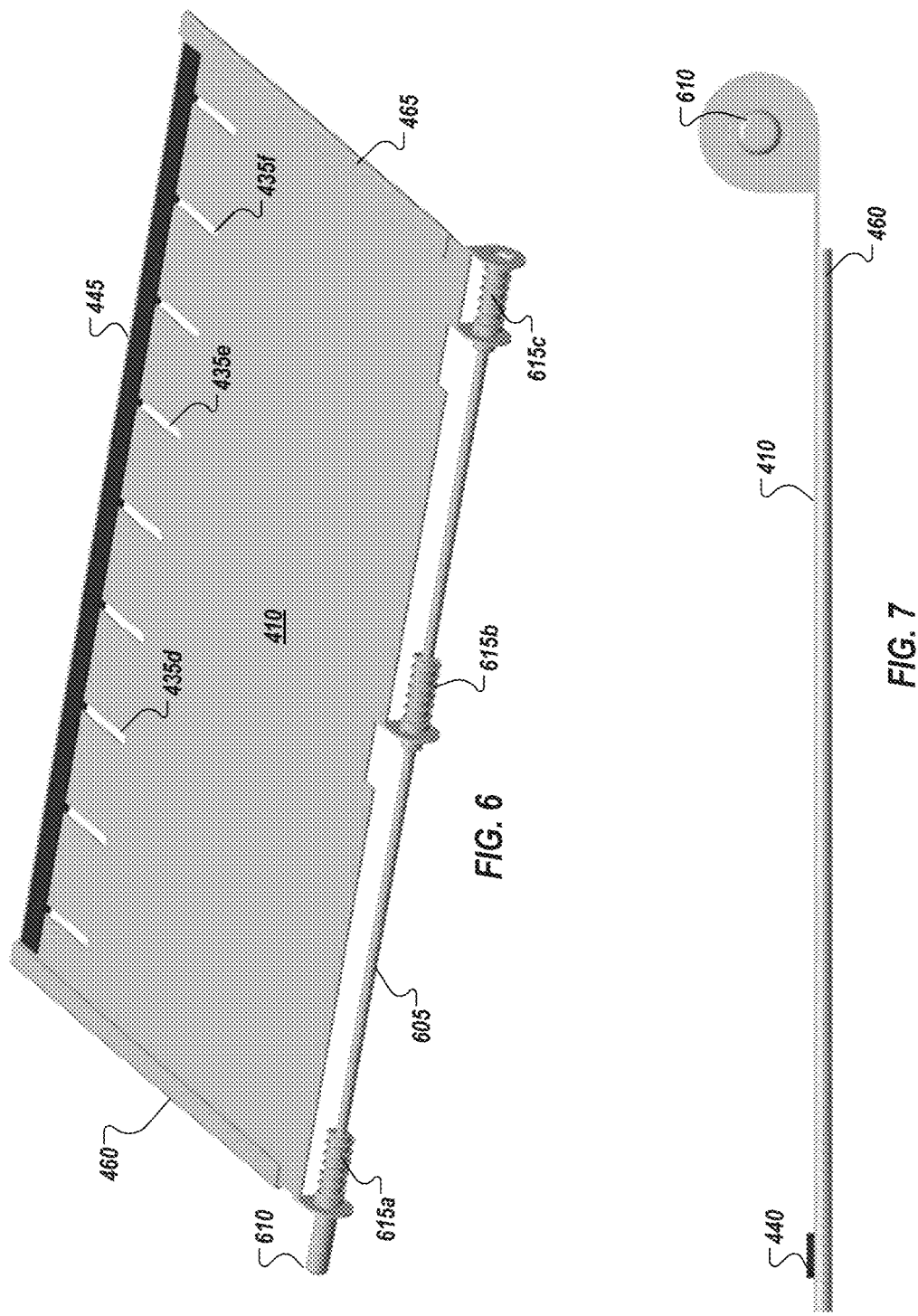

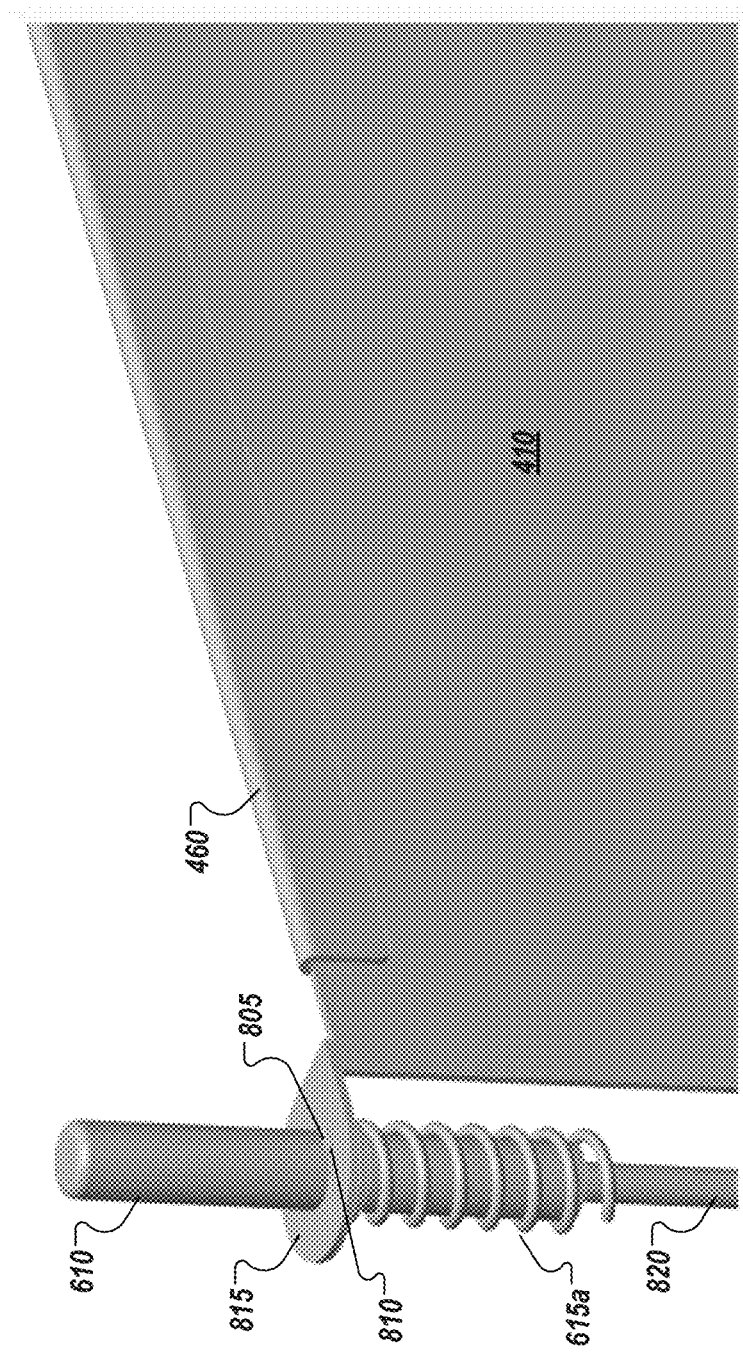

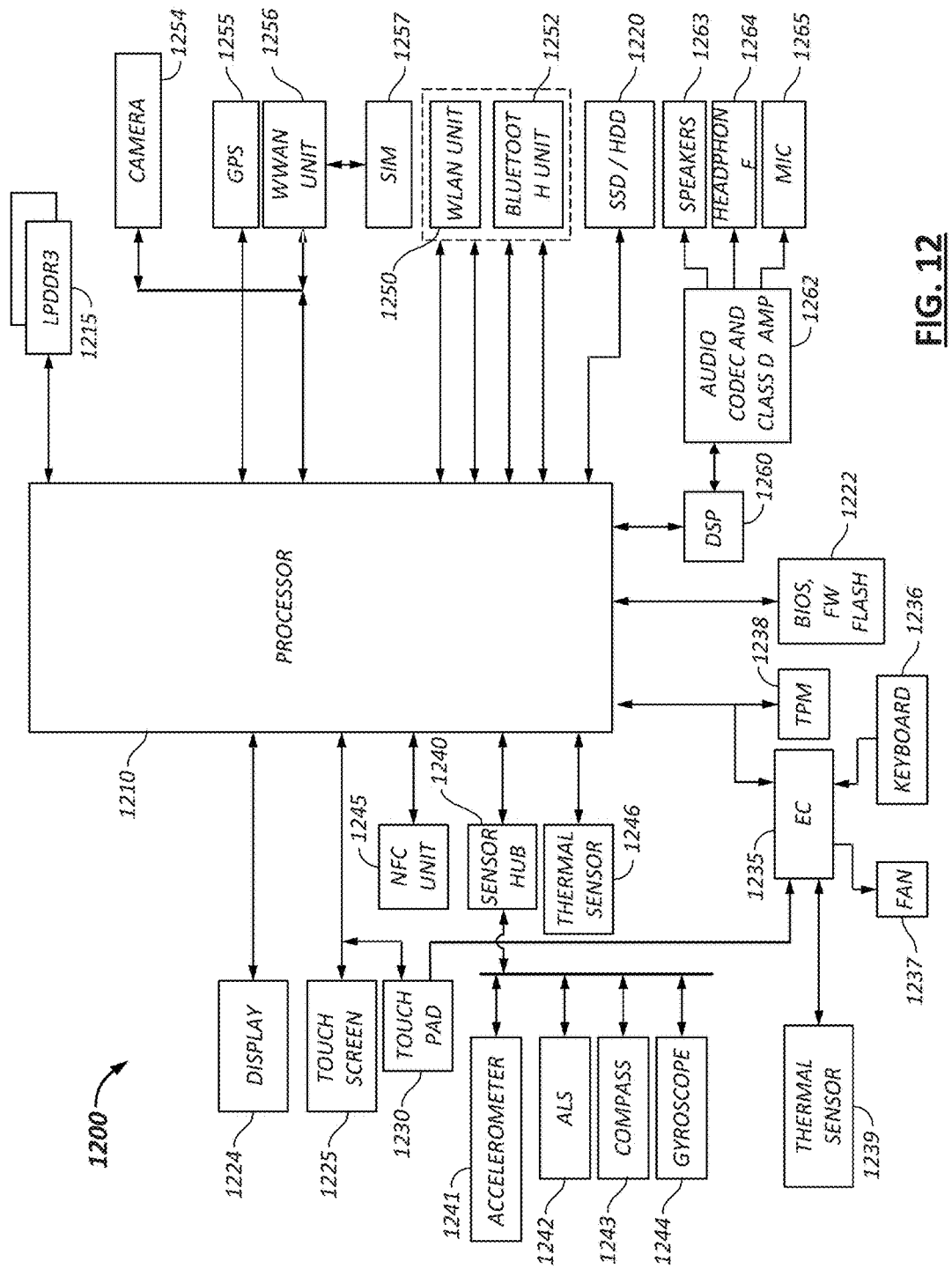

MULTI-ORIENTATION DISPLAY DEVICE

BACKGROUND

Smart phones, tablet computers, wearables, and other mobile computing devices have become very popular, even supplanting larger, more general purpose computing devices, such as traditional desktop computers in recent years. Increasingly, tasks traditionally performed on a general purpose computer are performed using mobile computing devices with smaller form factors and more constrained features sets and operating systems. Mobile computing devices include handheld computing devices that communicate over high speed wireless networks. Such mobile computing devices include smartphones, personal digital assistants, and media players with varying form factors. Larger mobile computing devices, such as tablet computers, are also available, offering larger display screens, memory, and battery life in some cases. Intermediate-size devices are also being offered, including large form factor smartphones affectionately known as "phablets" for falling between smartphones and tablet computers in size.

BRIEF DESCRIPTION OF THE DRAWINGS

FIG. 5A illustrates a top view of one embodiment of a computing device with a foldable display screen in an full screen orientation.

FIG. 5B illustrates a top view of one embodiment of a computing device with the foldable display screen positioned between two defined orientations.

FIG. 6 illustrates an example wing frame support member in accordance with at least one embodiment.

FIG. 7 illustrates a top view of the example wing frame support member illustrated in FIG. 6.

FIGS. 8A-8B illustrate a locking hinge for use in a foldable display assembly.

FIG. 12 illustrates an embodiment of another example computing system that can employ a foldable display screen.

DETAILED DESCRIPTION

Figure 1A:
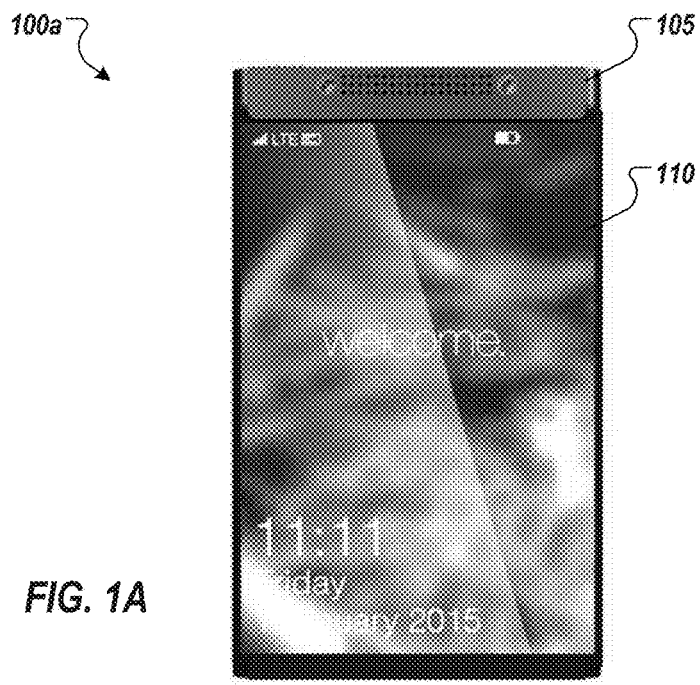
FIG. 1A illustrates one embodiment of a computing device with a foldable display screen in a first orientation in accordance with at least one embodiment.

The embodiments are generally directed to computing devices with a scalable display panel that allows for multiple display orientations and corresponding display dimensions. In some implementations, the scalable display panel can be implemented through a hinged, foldable display panel supporting a flexible display screen, such as for a smartphone, tablet, and/or docking convertible.

With the advent of mobile devices, a single user or household may own and use multiple different devices, including conventional desktop or laptop computers and various handheld or wearable devices, such as smartphones, personal digital assistants, tablet computers, netbooks, smart displays, smart watches, etc. These multiple devices, as they evolve, have increasingly overlapping feature sets, resulting in some redundancy between devices. Mobile devices have matured from being limited-use or single-use devices to being multipurpose general purpose computers supporting operating systems and applications that rival those found in higher-powered conventional desktop or laptop computers. Possessing multiple different devices not only multiple expenses (toward acquisition and maintenance), but can also involve multiple user learning curves, purchasing of multiple versions of the same applications, among other costs. Accordingly, some users seek a "one device" solution that allows them to minimize the number of devices that they use on a daily basis.

Given the increasing overlap between feature sets of some mobile devices, in some respects, the principal difference between these devices is the respective form factor adopted in each. For instance, a smartphone, tablet, and laptop may each allow a user to view and edit the same spreadsheet file, view the same video file, play the same gaming application, capture audio, photos, or video, and send the same electronic text, video, and/or telephony messages, among other features. However, the form factor and display device attributes (e.g., dimensions and aspect ratio) may make the use of one device preferable over another for some features while the other device is preferable for other features. Accordingly, a device can be provided that addresses these and other example issues, such as devices adopting one or more of the features described herein.

In the embodiments discussed below, one or more elements may be included. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1B:
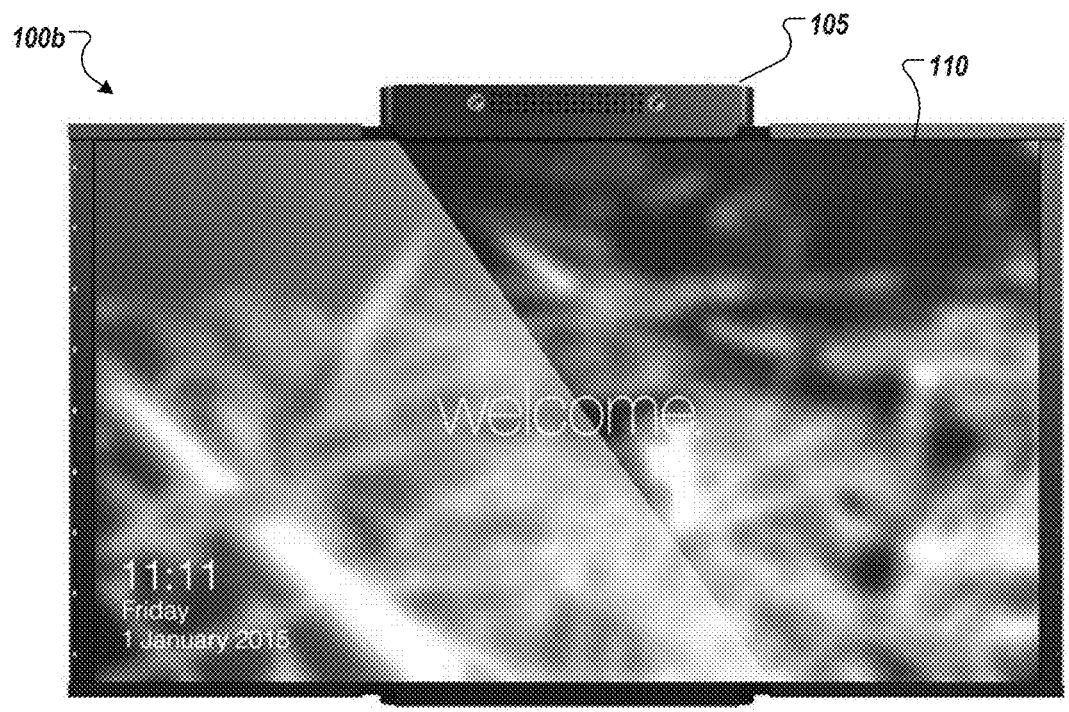
FIG. 1B illustrates the example computing device of FIG. 1A with the foldable display screen in a second orientation in accordance with at least one embodiment.

FIGS. 1A-1B illustrate views 100a,b of an example implementation of a computing device with a foldable display device that provides multiple potential viewing orientations. Each of the supported orientations may be a one of a set of predefined orientations each with a different physical dimension. The display may be a flexible display screen, such as a flexible display such as a liquid crystal display (LCD), light-emitting diode (LED), organic light-emitting diode (OLED), active-matrix organic light-emitting diode (AMOLED), or other display utilizing another display technology.

Figure 2A:
FIGS. 2A-2B illustrate perspective views of the example computing device illustrated in FIGS. 1A-1B.
Figure 2B:
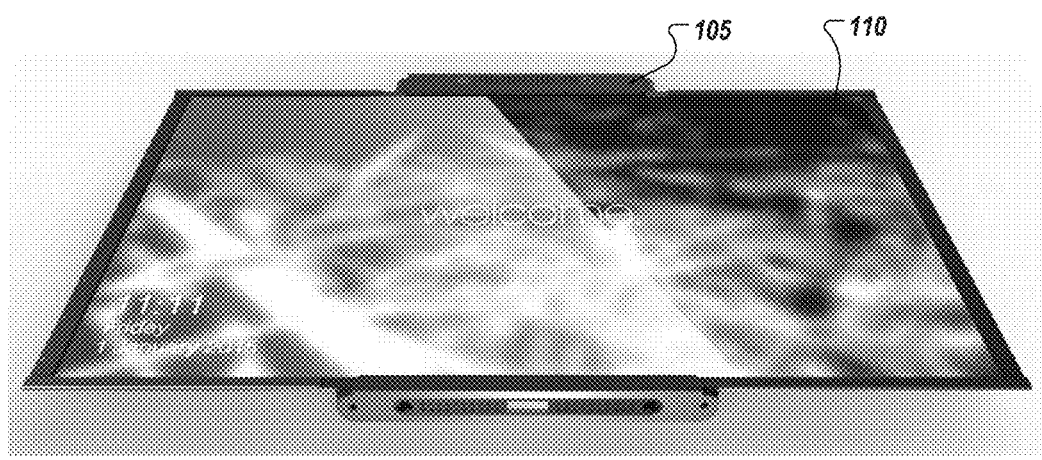

In one implementation, such as that shown in FIGS. 1A-1B, the computing device 105 may be a convertible handheld device that integrates a foldable display device 110 to permit the handheld device to convert between a handheld smartphone form factor with the display 110 in a first, folded orientation (as shown in FIG. 1A) and a larger tablet-style form factor with the display 110 in a second, unfolded orientation (as shown in FIG. 1B). FIGS. 2A and 2B show perspective views of the display device in the first and second orientations respectively. The entire available area of the flexible screen may be usable within the second, unfolded orientation, with the flexible screen portions forming a planer surface. In the folded orientation, one or more portions of the screen can be folded back behind the front face of the device, hiding these portions of the screen from view. The portion of the screen that remains forward facing (i.e., on the face of the device) may remain operational, while the folded back portions of the display device 110 are disabled. Disabling the hidden or folded back portions of the flexible screen can involve displaying black screen on the hidden portions, turning off the hidden portions, or otherwise causing no graphical information to be presented on the hidden portions while graphical user interfaces are provided on the active, unhidden portions of the screen (as shown in FIG. 1A).

Sensors can be provided on the computing device 105 to identify whether portions of the display device screen have been folded back and can cause graphic display processors and logic on the display to adjust the presentation on the display (and/or disable hidden portions of the display). In some cases, display orientation management can be further handled by the operating system of the computing device 105. FIGS. 1A and 1B illustrate that two versions of the same graphical user interface can be presented on each of the orientations provided on the convertible, foldable display device 110. For instance, as shown in FIG. 1A, a first version of a graphical user interface is shown according to a first aspect ratio usable in a folded screen orientation. FIG. 1B shows a second version of the graphical user interface adjusted to a second aspect ratio corresponding to the second, full-screen orientation available on the foldable display device 110. In some cases, one of the several orientations provided by a foldable display device 110 may be most desirable for some graphical user interfaces, activities, applications, and uses of the computing device, while other orientations may be more desirable for other graphical user interfaces, activities, applications, and uses of the computing device. For instance, it may be preferable to use a first, smaller (i.e., folded) orientation when using a SMS texting application and another, larger (i.e., at least partially unfolded) orientation is preferable for another application's GUI, such as a video player application, among many other examples. In still other examples, use of a particular feature or application may be conditioned on the display device being in a particular one of the orientations of the display device. For instance, when a user attempts to open a particular application or file, the application (and/or supporting display device logic) may cause instructions to be presented to the user (on the display device) prompting the user to place the foldable display device in a preferred one of the available orientations. For instance, one or more optimum display orientations can be identified for the application or file and the application (or display logic) can identify which orientation the display device is currently functioning in. If the current display orientation is not one of the identified optimum orientations, a prompt can be presented to the user to encourage or require the user to readjust the foldable display device to place the display device in one of the optimized orientations before proceeding with use or opening of the application or file, among other examples and features.

Figure 3:
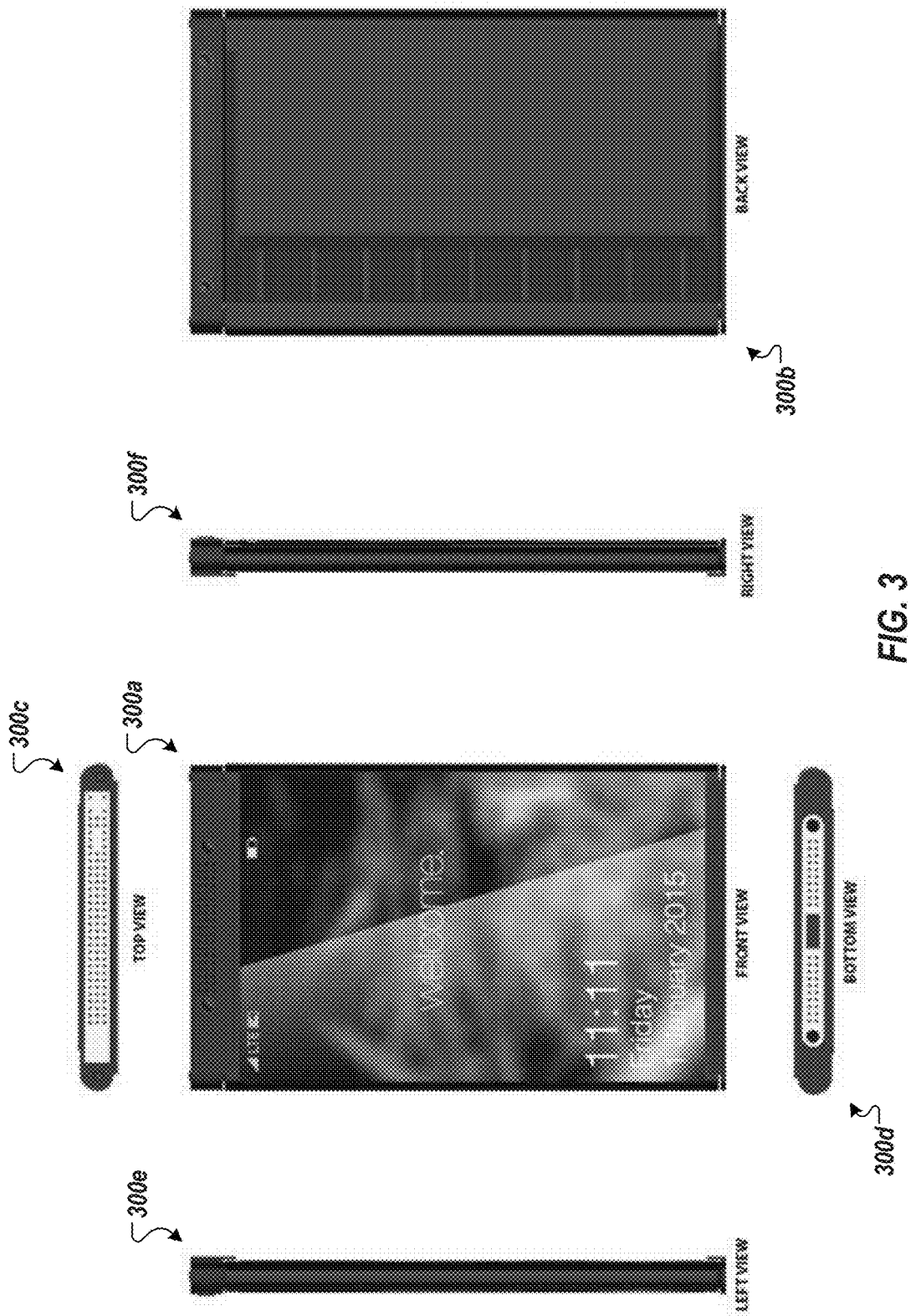
FIG. 3 illustrates multiple views of one embodiment of a computing device with a foldable display screen in accordance with at least one embodiment.

FIG. 3 illustrates multiple views 300a-f of an example implementation of a handheld computing device that includes an implementation of a foldable display device. Specifically, FIG. 3 shows front 300a, back 300b, top 300c, bottom 300d, left 300e, and right 300f views of the computing device while the device's display is in a folded orientation. The back, or rear, view 300b shows a portion of the foldable display that has been folded to wrap around the rear side of the device and hide the display from use. The portion of the display adjacent to the rear face of the device may be disabled, while the portion of the display that is forward-facing (e.g., oriented at least partially to present to a user viewing the front face of the computing device) is enabled and used to present a graphical user interface.

Figure 4A:
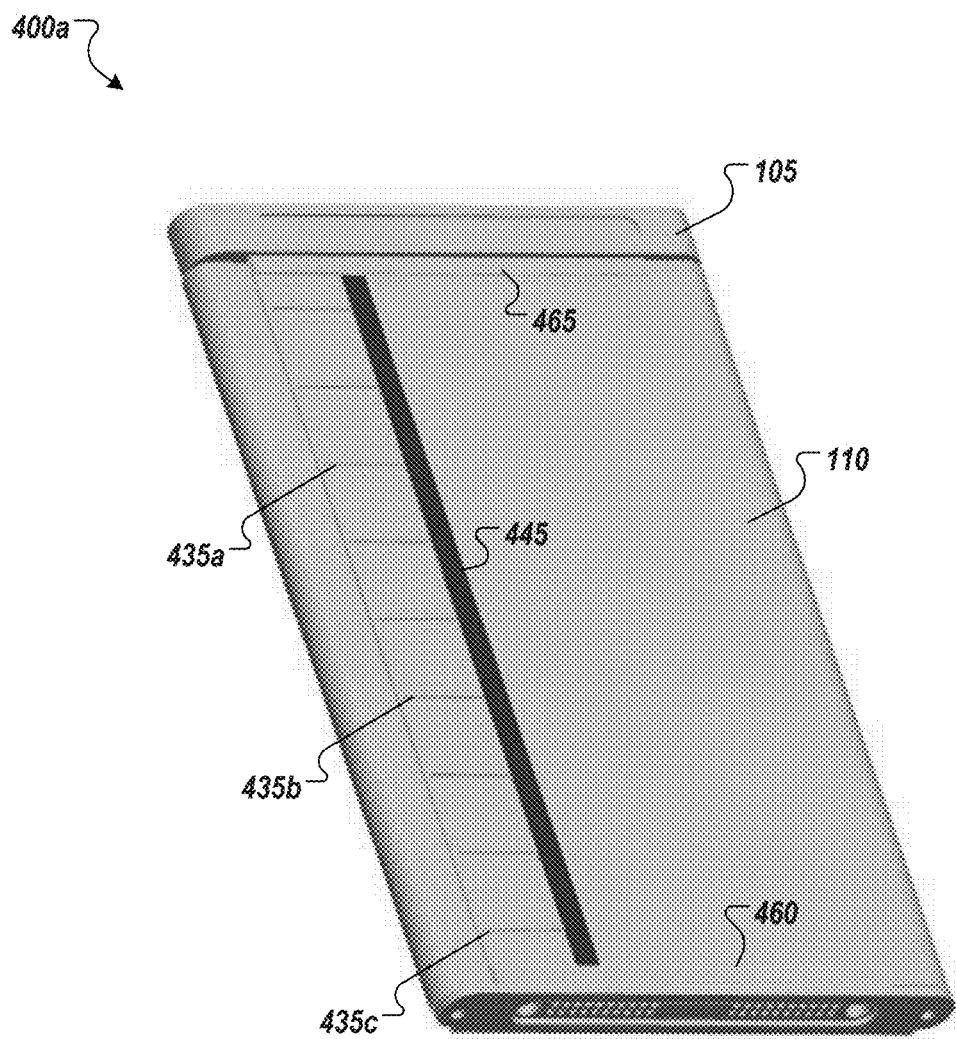
FIG. 4A illustrates a rear view of one embodiment of a computing device with a foldable display screen in a first orientation.
Figure 4B:
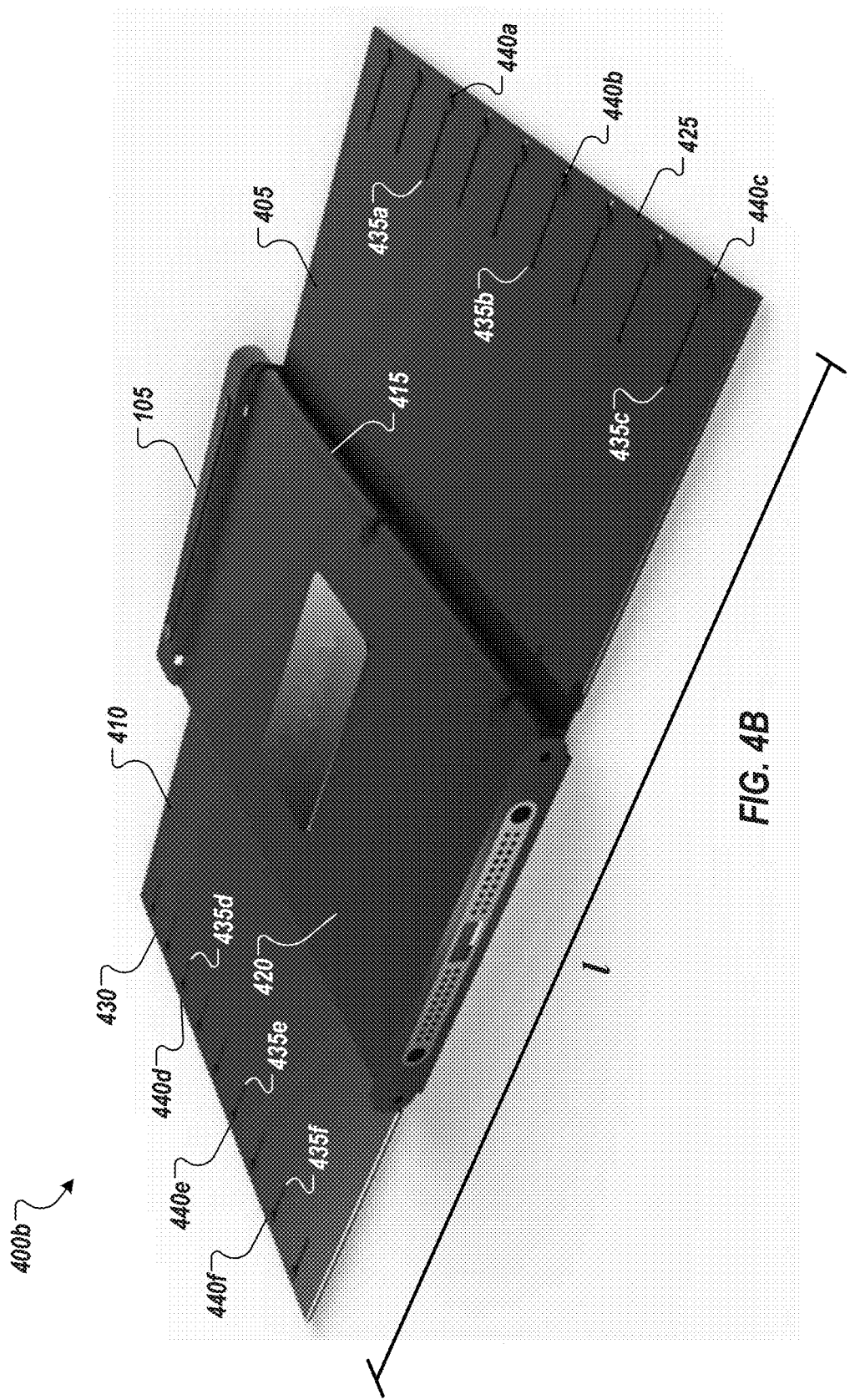
FIG. 4B illustrates a rear view of one embodiment of a computing device with a foldable display screen in a second orientation.

FIG. 4A illustrates a rear perspective view 400a of an example implementation of a computing device 105 with a scalable display screen 110. In the view of FIG. 4A, the display screen is in a folded orientation. FIG. 4B illustrates another view 400b of the same embodiment of the computing device 105 and display screen 110, this time in an extended, unfolded, or full-size orientation. As shown more clearly in the illustration of FIG. 4B showing the screen in its unfolded orientation, the device can be provided with one or more wings that support the screen and swing from the open position (shown in FIG. 4B) to a closed or folded position (shown in FIG. 4A). To facilitate the foldable support of the screen (e.g., by wing supports 405, 410), the supports can be constructed to enable the sliding of the screen within the support. This sliding can be the byproduct of the screen wrapping around the outer edge 415 of the housing 420 of the computing device. When in an open or unfolded orientation, the screen may span the combined length 1 of the wings 405, 410 and housing 420. However, when folded, a portion of the length 1 of the screen wraps around the edge of 415 of the base. In implementations where the flexible display lacks elasticity, the edge of the screen cannot remain at the edge (e.g., 425, 430) of the support wings (e.g., 405, 410) when it is folded around the device (e.g., into a closed or folded orientation). Accordingly, the support wings 405, 410 can allow the screen to retract away from the edges 425, 430 of the support wings 405, 410 all while still providing structural support for the flexible screen.

FIGS. 4A-4B illustrate track supports (e.g., 435a-f, collectively "435") that can be utilized in some implementations to facilitate shifting of a flexible display within a support frame provided for the display. The tracks can provide knobs (e.g., 440a-f, collectively "440") that are fixedly attached to the rear side of the screen and slide within the tracks 435. In one example, such as shown in FIG. 4A, the knobs 440 can be implemented on an edge frame piece 445 that is secured to the outer lateral edges of the display screen. As shown in FIG. 4B, the knobs 440 extend to near the outside end of each their respective tracks 435 when the wings and screen are in an open orientation, and the knobs 440 slide to near the other end of the tracks when the screen is in a closed orientation. Further, upper and lower tracks 460, 465 can also be provided on each wing to secure the top and bottom edge of the screen within the frame but still allowing the sliding of the screen within the frame as the screen transitions between orientations (e.g., folded and unfolded).

FIGS. 5A-5B show top views 500a,b of the embodiment introduced in FIGS. 4A-4B. FIG. 5A shows the top view of the device when in an opened position and FIG. 5B shows the top view of the same device in a partially folded position. As is illustrated in these views 500a,b, edge frame pieces 445, 450 are secured to the flexible screen 110 and knobs 440 are attached to each edge frame piece 445, 450. The knobs can slide within their respective tracks as the wings 405, 410 are opened and closed cause the screen to expand and contract (i.e., shift) within its support frame.

FIG. 6 illustrates an example embodiment of a wing support structure to be used in an implementation of a support frame for a foldable display. FIG. 6 shows the wing support 410 detached from the remainder of the support frame and display. FIG. 7 shows a top view of the same wing support illustrated in FIG. 6. In this example, a hinge 605 is integrated with the wing 410 to connect the wing 410 to the main device housing and facilitate the swinging or rotation (or swiveling) of the wing relative to the housing about an axis defined by the hinge rod. The wing, and thereby the display, can be folded about this hinge. Other mechanisms, such as alternative hinge implementations, can be provided in other instances to facilitate folding of the support frame and the flexible display. Shown, too, are support tracks (e.g., 435d, 435e, 435f), upper and lower frame tracks 460, 465, and the edge frame piece 445 of the wing 410. As noted above, the edge frame piece 445 is connected to the tracks 435 by corresponding knobs 440 that fix the edge frame piece 445 (and the screen to which it is to be attached) to the wing, while allowing the edge frame piece 445 and knobs 440 to slide back and forth within the tracks 435.

In the example of FIGS. 6 and 7, the hinge 605 attaches to the remainder of the wing support 410 at three places, although implementations can provide for the hinge to attach to the wing at more or fewer locations on the wing (e.g., 410). The hinge 605 can also be configured to be a locking hinge to define two or more positions for the wing 410. For instance, the hinge can cause the wing to lock in a folded and unfolded position to thereby define stable orientations for the corresponding display screen. A button 610 can be provided that when pressed opposes one or more springs (e.g., 615a-c) (or other mechanism biasing the hinge toward its locked position) to allow the wing to rotate around the hinge 605. The button 610, when released, can allow the hinge to re-lock when the wing rotates to one of the defined positions.

Figure 8B:
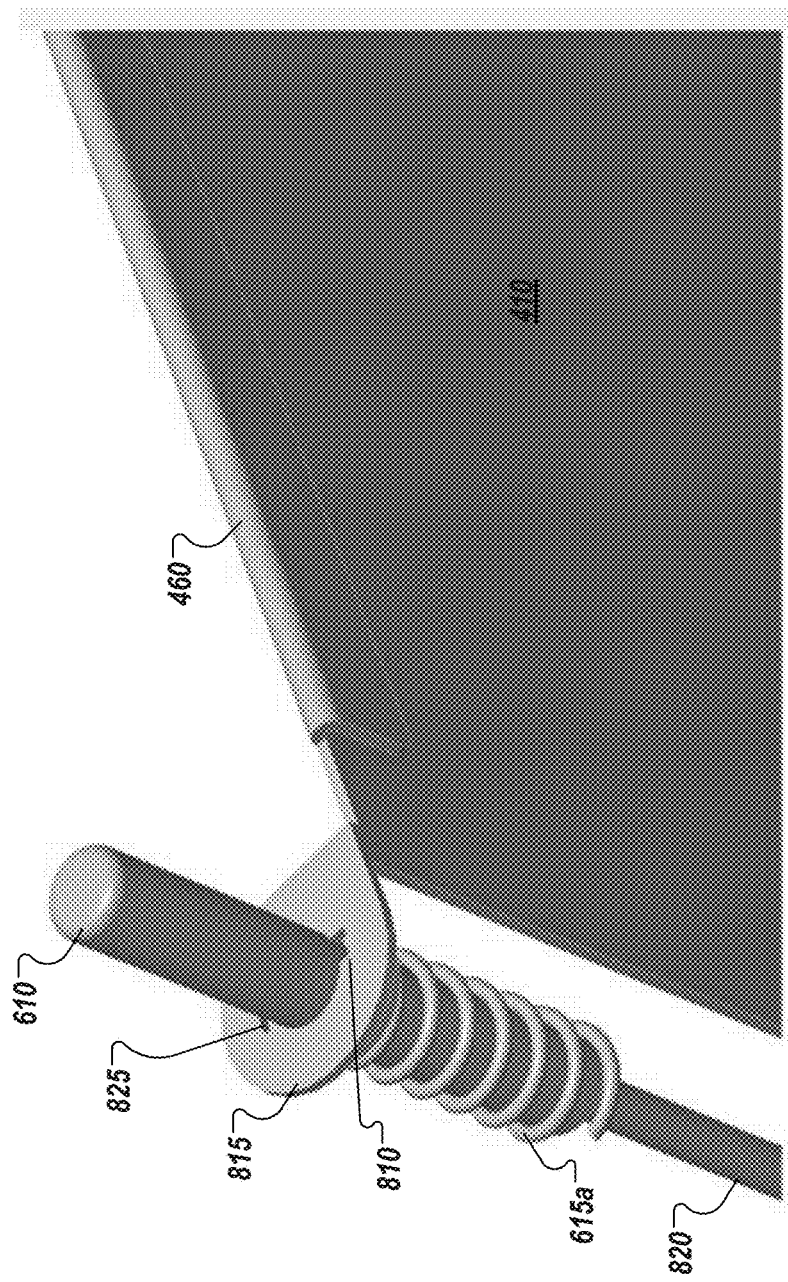

FIGS. 8A-8B illustrate a detailed view of an example implementation of a locking hinge 605 for use in facilitating a scalable display device. The body of the wing support 410 can connect to the hinge rod 820 and button by one or more connectors 815 that allow the wing frame 410 to rotate around the rod 820. Further, as introduced above, the hinge can be lockable. In one example, the locking mechanism of the hinge can include a tooth 805 and notch 810 lock. In the example of FIGS. 8A-8B, the tooth 805 is disposed on the button 610 capping hinge rod 820. One or more notches (e.g., 810) can be disposed on connector 815 that are configured to mate with tooth 805 and lock the wing in a corresponding position. In other instances, the tooth 805 can be disposed on the rod 820 itself. In still other implementations, the tooth (or teeth) can be disposed on the connector 815 and the notch(es) can be provided on the hinge rod or button.

FIG. 8A shows the hinge lock in a first locked position, with the tooth 805 aligned with and securely engaged in the notch 810. One or more springs (e.g., 615a) bias the rod 820 to keep the tooth 805 engaged in the notch 810. FIG. 8B shows the hinge lock in an unlocked position. In the view of FIG. 8B, the button 610 has been depressed causing the tooth (or teeth) to descend below connector 815 and notches 810, 825, thereby disengaging the lock. With the lock disengaged, the wing frame 410 can rotate freely about the hinge rod 820 at wing connector 815. In this example, two notches (e.g., 810, 825) and corresponding teeth are provided to define two positions or orientations of the wing frame (and a display to which it is to be connected). When the wing frame 410 rotates 180 degrees from the starting position shown in FIGS. 8A-8B and the button 610 is released, the wing frame 410 can lock into a second position, with tooth 805 engaged with notch 825. In other instances, more than two lock positions can be provided, with corresponding teeth and notches, among other examples and implementations.

Referring back to FIG. 3, all or a portion of hinge button 610 can be enclosed within the housing of a device. In this example, two wings are provided with two corresponding wings and locking hinges. The housing can be provided with depressible button elements 305, 310 that align with the tops of hinge buttons (e.g., 610) enclosed within the housing. A user can press on the button elements 305, 310, to contact and depress the underlying hinge buttons to disengage the hinge lock (such as illustrated and described in the examples of FIGS. 8A-8B). With the hinge locks disengaged, a user can fold or unfold corresponding wing supports a display screen portions to place the display device into a desired one of its supported orientations.

Figure 9B:
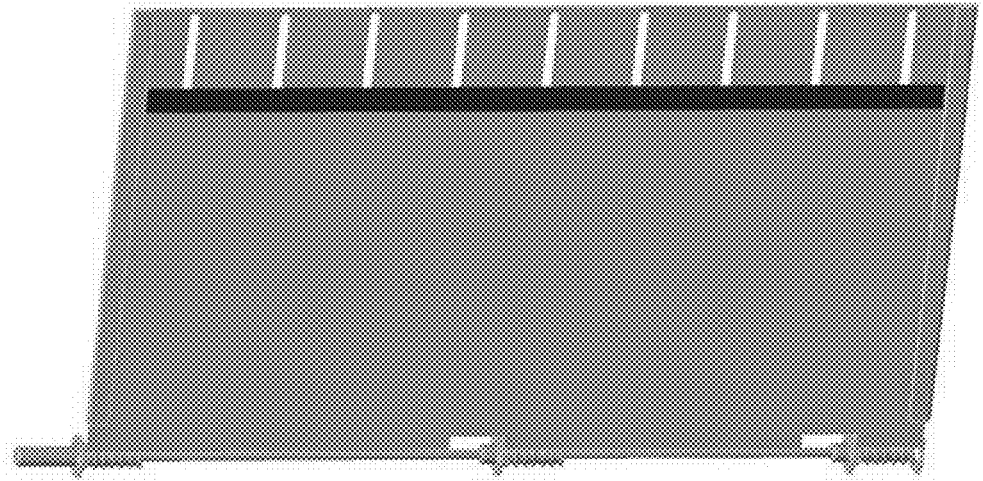
FIGS. 9A-9B illustrate views of an example wing frame support member in accordance with at least one embodiment.
Figure 9A:
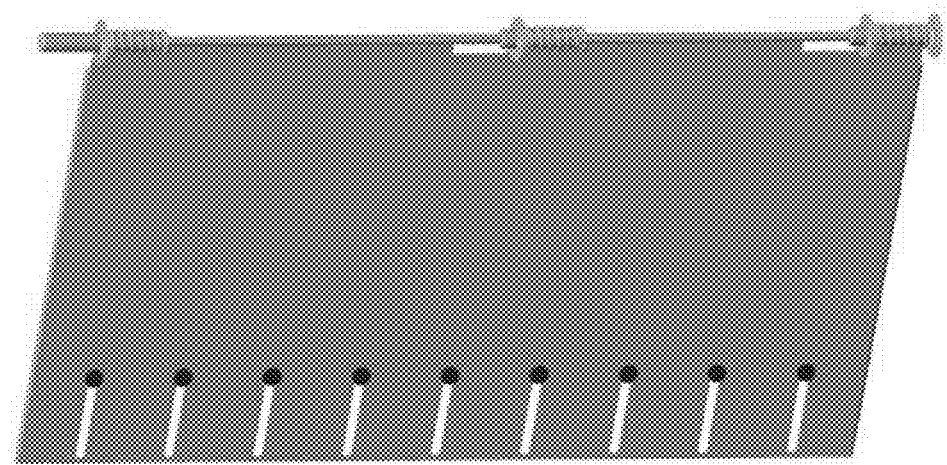
Figure 10B:
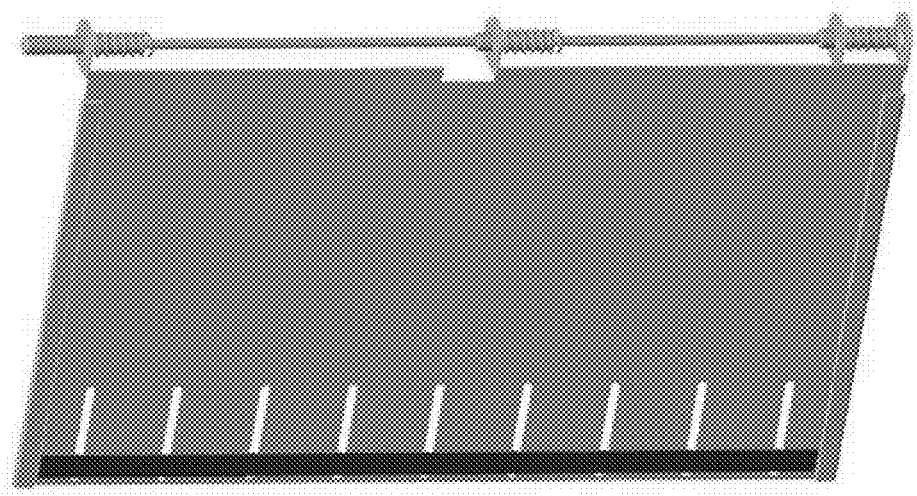
FIGS. 10A-10B illustrate views of an example wing frame support member in accordance with at least one embodiment.
Figure 10A:
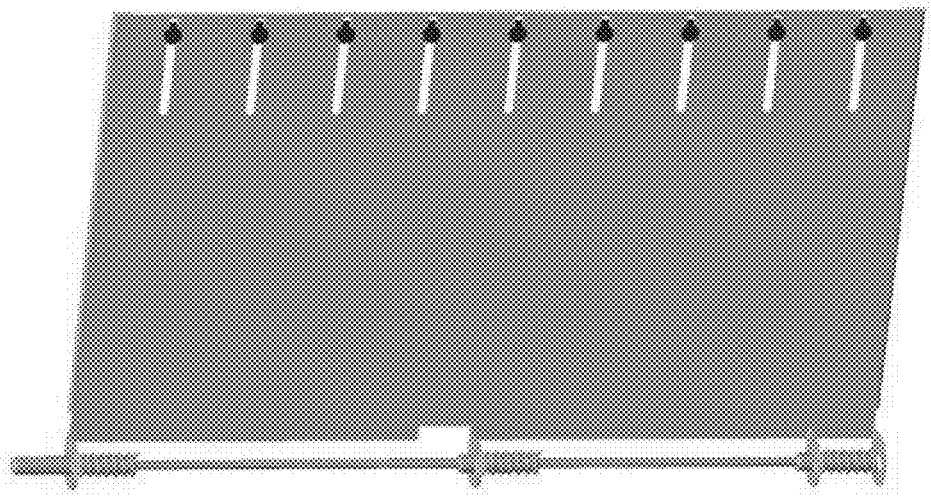

FIGS. 9A-9B and FIGS. 10A-10B illustrate additional views of wing frame supports 405, 410 and corresponding locking hinges. FIG. 9A shows a rear view of a right wing frame 410 (and corresponding support tracks 435d-f and knobs 440d-f). FIG. 9B shows a front view of the right wing frame 410. FIGS. 9A-9B shows the slidable supports of the right wing 410 in a fully retracted position (e.g., corresponding to the wing frame 410 and display being in a folded orientation). FIG. 10A shows a front view of the left wing frame 405, FIG. 10B showing a rear view of the same left wing frame 405 (and corresponding support tracks 435a-c and knobs 440a-c). FIGS. 10A-10B shows the slidable supports of the leftwing 405 in a fully extended position (e.g., corresponding to the wing frame 405 and display being in a full-screen or unfolded orientation). In the examples of FIGS. 9A-10B each wing frame 405, 410 connects to the hinge at multiple positions (e.g., at connectors 815a-f). Respective springs and hinge locks can be provided at each of the connectors 815a-f (e.g., similar to the connector 815 shown and described in connection with the examples of FIGS. 8A-8B).

It should be appreciated that the specific examples shown and described herein are presented for the sake of illustrating certain features and attributes that can also be applied to other alternative designs and implementations. For instance, wings can themselves be foldable to define further display surface portions (and corresponding orientation options), by providing for hinges bisecting (or trisecting, etc.) the body of the hinge. In still other examples, additional wings can be provided that are attached at the top and or bottom of the main device housing (in addition to or instead of wings provided at the sides of the main device housing, such as shown in the examples of FIGS. 1A-4B). In implementations utilizing multiple wings, display screen orientations can be defined where no screens are folded to direct a portion outside of the screen display area, where only one wing is folded to direct its corresponding display portion outside the screen display area, where more than one wing is folded, or where all wings are folded (e.g., leaving only the center display portion, mounted to or forming the front face of the main device housing, as the screen display area in a corresponding orientation), among other examples.

Figure 11:
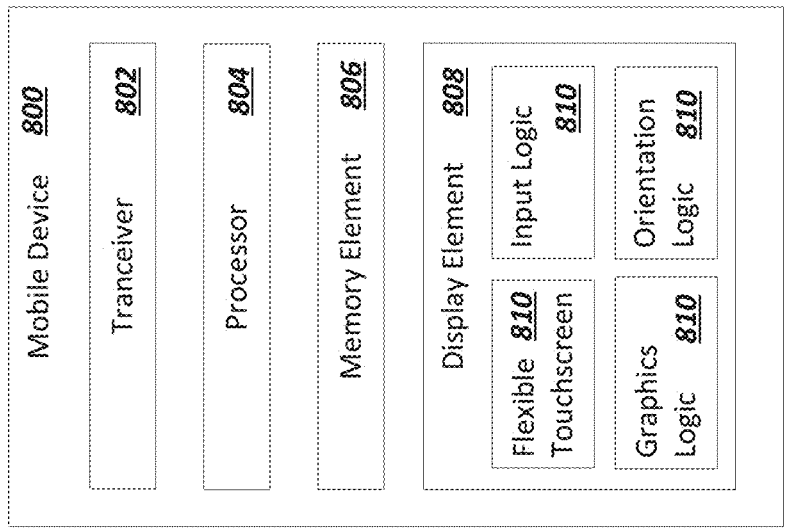
FIG. 11 illustrates an embodiment of an example computing system that can employ a foldable display screen.

FIG. 11 illustrates a block diagram is illustrated of an example mobile device 1100. Mobile device 1100 is an example of a possible computing system (e.g., a host or endpoint device) of the examples and implementations described herein. In an embodiment, mobile device 1100 operates as a transmitter and a receiver of wireless communications signals. Specifically, in one example, mobile device 1100 may be capable of both transmitting and receiving cellular network voice and data mobile services. Mobile services include such functionality as full Internet access, downloadable and streaming video content, as well as voice telephone communications.

Mobile device 1100 may correspond to a conventional wireless or cellular portable telephone, such as a handset that is capable of receiving "3G", or "third generation" cellular services. In another example, mobile device 1100 may be capable of additionally or alternatively transmitting and receiving "4G", "LTE", or any other mobile service.

Examples of devices that can correspond to mobile device 1100 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 1100 illustrated in FIG. 11 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 1100 includes a transceiver 1102, which is connected to and in communication with an antenna. Transceiver 1102 may be a radio frequency transceiver. Also, wireless signals may be transmitted and received via transceiver 1102. Transceiver 1102 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 1102 is connected to a processor 1104, which may perform the bulk of the digital signal processing of signals to be communicated and signals received, at the baseband frequency. Processor 1104 can provide a graphics interface to a display element 1108, for the display of text, graphics, and video to a user. The display element 1108, as introduced above, can be a scalable, foldable display device including a flexible display screen 1110. The flexible screen can be a touchscreen and display element can include graphics logic 1112 (for use in rendering data for display on the device) and input logic 1114 for recognizing touch gestures and other inputs. Display element 1108 can additionally include orientation logic 1116 including sensors and logic circuitry to identify when the screen has been folded in a particular orientation. Orientation logic 1116 can detect changes in orientation and relay these changes to cause the corresponding graphics, displayed on the device, to be modified and adapted to the present orientation of the screen. Orientation logic 1116 can also cause portions of the flexible screen 1110 to be enabled or disabled based upon the detected screen orientation, among other example functionality.

In an aspect of this disclosure, processor 1104 may be a processor that can execute any type of instructions to achieve the functionality and operations as detailed herein. Processor 1104 may also be coupled to a memory element 1106 for storing information and data used in operations performed using the processor 1104. Additional details of an example processor 1104 and memory element 1106 are subsequently described herein. In an example embodiment, mobile device 1100 may be designed with a system-on-a-chip (SoC) architecture, which integrates many or all components of the mobile device into a single chip, in at least some embodiments.

FIG. 12 illustrates a block diagram of components present in a more detailed example of a computer system in accordance with an embodiment of the present disclosure. As shown in FIG. 12, system 1200 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 12 is intended to show a high level view of many components of the computer system. However, it is to be understood that some of the components shown may be omitted, additional components may be present, and different arrangement of the components shown may occur in other implementations. As a result, the invention described above may be implemented in any portion of one or more of the interconnects illustrated or described below.

As seen in FIG. 12, a processor 1210, in one embodiment, includes a microprocessor, multi-core processor, multi-threaded processor, an ultra low voltage processor, an embedded processor, or other known processing element. In the illustrated implementation, processor 1210 acts as a main processing unit and central hub for communication with many of the various components of the system 1200. As one example, processor 1200 is implemented as a system on a chip (SoC). As a specific illustrative example, processor 1210 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1210 in one implementation will be discussed further below to provide an illustrative example.

Processor 1210, in one embodiment, communicates with a system memory 1215. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1220 may also couple to processor 1210. In various embodiments, to enable a thinner and lighter system design as well as to improve system responsiveness, this mass storage may be implemented via a solid state drive (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 12, a flash device 1222 may be coupled to processor 1210, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1200. Specifically shown in the embodiment of FIG. 12 is a display 1224 which may be a high definition LCD or LED panel configured within a lid portion of the chassis. This display panel may also provide for a touch screen 1225, e.g., adapted externally over the display panel such that via a user's interaction with this touch screen, user inputs can be provided to the system to enable desired operations, e.g., with regard to the display of information, accessing of information and so forth. In one embodiment, display 1224 may be coupled to processor 1210 via a display interconnect that can be implemented as a high performance graphics interconnect. Touch screen 1225 may be coupled to processor 1210 via another interconnect, which in an embodiment can be an I²C interconnect. As further shown in FIG. 12, in addition to touch screen 1225, user input by way of touch can also occur via a touch pad 1230 which may be configured within the chassis and may also be coupled to the same I²C interconnect as touch screen 1225.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920 x 1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1210 in different manners. Certain inertial and environmental sensors may couple to processor 1210 through a sensor hub 1240, e.g., via an I²C interconnect. In the embodiment shown in FIG. 12, these sensors may include an accelerometer 1241, an ambient light sensor (ALS) 1242, a compass 1243 and a gyroscope 1244. Other environmental sensors may include one or more thermal sensors 1246 which in some embodiments couple to processor 1210 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 12, various peripheral devices may couple to processor 1210 via a low pin count (LPC) interconnect. In the embodiment shown, various components can be coupled through an embedded controller 1235. Such components can include a keyboard 1236 (e.g., coupled via a PS2 interface), a fan 1237, and a thermal sensor 1239. In some embodiments, touch pad 1230 may also couple to EC 1235 via a PS2 interface. In addition, a security processor such as a trusted platform module (TPM) 1238 in accordance with the Trusted Computing Group (TCG) TPM Specification Version 1.2, dated Oct. 2, 2003, may also couple to processor 1210 via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1200 can communicate with external devices in a variety of manners, including wirelessly. In the embodiment shown in FIG. 12, various wireless modules, each of which can correspond to a radio configured for a particular wireless communication protocol, are present. One manner for wireless communication in a short range such as a near field may be via a near field communication (NFC) unit 1245 which may communicate, in one embodiment with processor 1210 via an SMBus. Note that via this NFC unit 1245, devices in close proximity to each other can communicate. For example, a user can enable system 1200 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 12, additional wireless units can include other short range wireless engines including a WLAN unit 1250 and a Bluetooth unit 1252. Using WLAN unit 1250, Wi-Fi™ communications in accordance with a given Institute of Electrical and Electronics Engineers (IEEE) 802.11 standard can be realized, while via Bluetooth unit 1252, short range communications via a Bluetooth protocol can occur. These units may communicate with processor 1210 via, e.g., a USB link or a universal asynchronous receiver transmitter (UART) link. Or these units may couple to processor 1210 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1256 which in turn may couple to a subscriber identity module (SIM) 1257. In addition, to enable receipt and use of location information, a GPS module 1255 may also be present. Note that in the embodiment shown in FIG. 12, WWAN unit 1256 and an integrated capture device such as a camera module 1254 may communicate via a given USB protocol such as a USB 2.0 or 3.0 link, or a UART or $I^2C$ protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1260, which may couple to processor 1210 via a high definition audio (HDA) link. Similarly, DSP 1260 may communicate with an integrated coder/decoder (CODEC) and amplifier 1262 that in turn may couple to output speakers 1263 which may be implemented within the chassis. Similarly, amplifier and CODEC 1262 can be coupled to receive audio inputs from a microphone 1265 which in an embodiment can be implemented via dual array microphones (such as a digital microphone array) to provide for high quality audio inputs to enable voice-activated control of various operations within the system. Note also that audio outputs can be provided from amplifier/CODEC 1262 to a headphone jack 1264. Although shown with these particular components in the embodiment of FIG. 12, understand the scope of the present invention is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1210 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1235. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1235 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 12, understand the scope of the present invention is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design, performance or cost constraints. Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may comprise a non-transitory medium in some embodiments and may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The following examples pertain to embodiments in accordance with this Specification. The following examples pertain to embodiments in accordance with this Specification. An apparatus can be provided that includes a foldable frame to support a flexible display screen. The frame includes a housing to enclose one or more processor devices and support a center portion of the display screen, a first wing extending from a first side of the housing and connected to the housing by a first hinge to support a first side portion of the display screen, and a second wing extending from a second side of the housing and connected to the housing by a second hinge to support a second side portion of the display screen. The first wing can be operable to swivel about a first axis defined by the first hinge and the second wing can be operable to swivel about a second axis defined by the second hinge. The first wing and second wing can support the display screen in a first orientation when positioned parallel with the front face of the housing to form a plane bounded by an outside edge of the first wing and an outside edge of the second wing, and at least the first wing can be folded adjacent to the a rear face of the housing to support the display screen in a second orientation.

In one or more embodiments, the first orientation can define a first display surface area and the second orientation can define a smaller, second display surface area. The first display surface area can include the center, first side, and second side portions of the display screen, and at least the first side portion of the display screen can be excluded from the second display surface area. The second wing is folded adjacent to the first wing behind the front surface of the housing in the second orientation, and the second side portion of the display screen can also be excluded from the second display surface area. At least the first side portion of the display screen can be disabled when in the second orientation. The second wing can extend from the housing to form a plane with the front face of the housing in the first orientation, and the second wing can be folded adjacent to the first wing behind the front surface of the housing in the second orientation, where the first wing is folded adjacent to the a rear face of the housing and the second wing is folded adjacent to the first wing behind the front surface of the housing to support the display screen in a third orientation, the third orientation defining a third display surface area in which both the first and second side portions of the display are excluded from the third display surface area. The first display surface area can correspond to a graphical display of a tablet computer and the second display surface area can correspond to a graphical display of a smartphone.

In one or more embodiments, one or more sensors can be provided to identify whether the first and second wings are positioned to define the first orientation or the second orientation. GUIs presented on the display screen can be adapted based on whether the first orientation or the second orientation is sensed by the one or more sensors. Each of the first and second wings can include a respective lateral frame support to attach to a corresponding outside edge of the display screen, and one or more tracks that connect to the lateral frame support and enable lateral sliding of the lateral frame support within the wing. The one or more tracks can include an upper edge track, a lower edge track, at least one center track. Each of the first and second hinges can include lockable hinges to lock the corresponding wing in at least the first and second orientations. Each of the first and second hinges can include a respective hinge lock including at least one tooth and at least one notch to accept the tooth, and a button to disengage the hinge lock to allow the wing to swivel about an axis. Each of the first and second hinges can be at least partially enclosed within the housing.

In at least one embodiment, a computing device can be provided that includes at least one processor device, at least one memory element, a flexible display screen, a housing to house the at least one processor device and the at least one memory element, and a first wing to support a side portion of the display screen. The front face of the housing can include a center portion of the display screen. The first wing can be connected to the housing by a hinge, the first wing configured to swivel about an axis defined by the hinge. The hinge can be configured to lock the first wing in at least two wing positions, a first of the wing positions supports the side portion of the display screen in a first orientation, a second of the wing positions supports the side portion of the display screen in a second orientation, and the side portion of the display screen is active in the first orientation and hidden in the second orientation. In some examples, the flexible display screen is a touchscreen.

In at least one embodiment, an apparatus is provided with a display screen device that includes a flexible display screen and a foldable frame operable to fold the flexible display screen into at least two orientations. A first of the at least two orientations defines a first active display screen area, a second of the at least two orientations defines a second, smaller active display screen area, a center portion of the display screen remains active in each of the first and second active display screen areas, and at least one side portion of the display screen is disabled in the second orientation.

In one example, the foldable frame includes a central housing supporting the center portion of the display screen, a first wing support attached to the central housing by a first hinge and supporting a first side portion of the display screen, and second wing support attached to the central housing by a second hinge and supporting a second side portion of the display screen. The first wing support can include a plurality of tracks to enable sliding of the first side portion of the display screen within the first wing support, and the second wing support can also include a plurality of tracks to enable sliding of the second side portion of the display screen within the second wing support.

Although specific embodiments have been illustrated and described herein, it should be appreciated that any arrangement calculated to achieve the same purpose may be substituted for the specific embodiments shown. For instance, it should be noted that the methods described herein do not have to be executed in the order described, or in any particular order. Moreover, various activities described with respect to the methods identified herein can be executed in serial or parallel fashion. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. An apparatus comprising:
a foldable frame to support a flexible display screen of the computing device, wherein the frame comprises:
a housing to enclose one or more processor devices, wherein a center portion of the flexible display screen is to be supported by a front face of the housing;

a first wing extending from a first side of the housing and connected to the housing by a first hinge, wherein a first side portion of the flexible display screen is supported by the first wing;

a second wing extending from a second side of the housing and connected to the housing by a second hinge, wherein a second side portion of the flexible display screen is supported by the second wing;

wherein the first wing is operable to swivel about a first axis defined by the first hinge and the second wing is operable to swivel about a second axis defined by the second hinge, the first wing and second wing support the flexible display screen in a first orientation when positioned parallel with the front face of the housing to form a plane bounded by an outside edge of the first wing and an outside edge of the second wing, and the first wing and the second wing are folded to each other and adjacent to the a rear face of the housing to support the flexible display screen in a second orientation, and wherein at least one of the first and second hinge comprises a movable, spring-loaded joint which connects two linked objects and keep a tooth engaged in a notch to maintain the hinge in a lock position; and a button to bias at least one spring and cause the tooth to descend below the notch to unlock the hinge.

2. The apparatus of claim 1, wherein the first orientation defines a first display surface area and the second orientation defines a smaller, second display surface area.

3. The apparatus of claim 2, wherein the first display surface area comprises the center, first side, and second side portions of the flexible display screen, and at least the first side portion of the flexible display screen is excluded from the second display surface area.

4. The apparatus of claim 3, wherein the second wing is folded adjacent to the first wing behind the front surface of the housing in the second orientation, wherein the second side portion of the flexible display screen is also excluded from the second display surface area.

5. The apparatus of claim 3, wherein the first side portion of the flexible display screen is to be reenabled by the controller when returned to the first orientation from the second orientation.

6. The apparatus of claim 3, wherein the second wing extends from the housing to form a plane with the front face of the housing in the first orientation, and the second wing is folded adjacent to the first wing behind the front surface of the housing in the second orientation, wherein the first wing is folded adjacent to the a rear face of the housing and the second wing is folded adjacent to the first wing behind the front surface of the housing to support the flexible display screen in a third orientation, the third orientation defines a third display surface area, wherein both the first and second side portions of the display are excluded from the third display surface area.

7. The apparatus of claim 3, wherein the first display surface area corresponds to a graphical display representation of a tablet computer and the second display surface area corresponds to a graphical display representation of a smartphone.

8. The apparatus of claim 1, further comprising the flexible display screen.

9. The apparatus of claim 1, further comprising one or more sensors to identify whether the first and second wings are positioned to define the first orientation or the second orientation.

10. The apparatus of claim 9, wherein a graphical user interface to be presented on the flexible display screen is to be adapted based on whether the first orientation or the second orientation is sensed by the one or more sensors.

11. The apparatus of claim 1, wherein each of the first and second wings comprise:
a lateral frame support to attach to a corresponding outside edge of the display screen;
one or more tracks, wherein the lateral frame support is connected to the one or more tracks, and the one or more tracks enable lateral sliding of the lateral frame support within the wing.

12. The apparatus of claim 11, wherein the one or more tracks comprise an upper edge track, a lower edge track, at least one center track.

13. The apparatus of claim 1, wherein each of the first and second hinges comprise lockable hinges to lock the corresponding wing in at least the first and second orientations.

14. The apparatus of claim 13, wherein each of the first and second hinges are at least partially enclosed within the housing.

15. A computing device comprising:
at least one processor device;
at least one memory element;
a flexible display screen;
a housing to house the at least one processor device and the at least one memory element, wherein a front face of the housing comprises a center portion of the flexible display screen; and,
a first wing to support a side portion of the flexible display screen, wherein the first wing is connected to the housing by a hinge, the first wing is configured to swivel about an axis defined by the hinge, the hinge is configured to lock the first wing in at least two wing positions, a first of the wing positions supports the side portion of the flexible display screen in a first orientation, a second of the wing positions supports the side portion of the flexible display screen in a second orientation, and the side portion of the flexible display screen is active in the first orientation and hidden in the second orientation;
wherein, the hinge of the first wing comprises a movable, spring-loaded joint which connects two linked objects and keep a tooth engaged in a notch to maintain the hinge in a lock position; and a button to bias at least one spring and cause the tooth to descend below the notch to unlock the hinge.

16. The computing device of claim 15, wherein the side portion of the flexible display screen comprises a first side portion and the computing device further comprises at least one second wing to support at least one second side portion of the flexible display screen.

17. The computing device of claim 15, wherein the flexible display screen comprises a touchscreen.

18. An apparatus comprising:
a display screen device comprising:
a flexible display screen and
a foldable frame operable to fold the flexible display screen into at least two orientations, wherein a first of the at least two orientations defines a first active display screen area, a second of the at least two orientations defines a second, smaller active display screen area, a center portion of the flexible display screen remains active in each of the first and second active display screen areas, and at least one side portion of the flexible display screen is disabled in the second orientation; and, a first wing to support a side portion of the flexible display screen, wherein the first wing is connected to a housing by a hinge, the first wing is configured to swivel about an axis defined by the hinge, the hinge is configured to lock the first wing in at least two wing positions, a first of the wing positions supports the side portion of the flexible display screen in the first orientation, a second of the wing positions supports the side portion of the flexible display screen in the second orientation, and the side portion of the flexible display screen is active in the first orientation and hidden in the second orientation;

wherein, the foldable frame comprises a movable, spring-loaded joint which connects two linked objects and keep a tooth engaged in a notch to maintain the hinge in a lock position; and a button to bias at least one spring and cause the tooth to descend blow the notch to unlock the hinge.

19. A method for providing a dynamic multi-mode display device coupled to a handheld, mobile communication device, the method comprising:

providing the handheld, mobile communication device, the handheld, mobile communication device having a center display;

disposing a processor into the handheld, mobile communication device;

integrating a foldable frame to support two peripheral display screens, the two peripheral display screens juxtaposed to the center display of the handheld, mobile communication device, wherein the foldable frame is configured to:
  transform from a first mode resembling a mobile device to second mode resembling a tablet device, the transformation comprising unfolding the two peripheral displays screen from a stored position for the first mode to the tablet mode for the second mode; and, unlocking the two peripheral displays screen by a button to bias at least one spring and cause a tooth to descend below the notch to unlock a hinge.

* * * * *